April 28, 1931.  L. M. DAVIS  1,803,056
SPOON HOOK
Filed Jan. 3, 1930
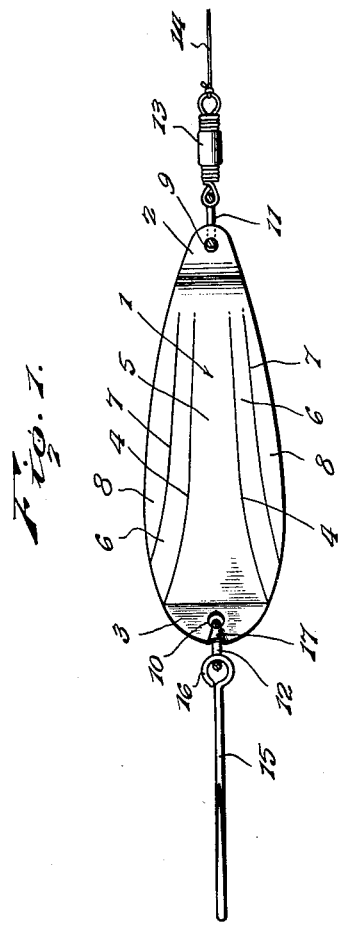
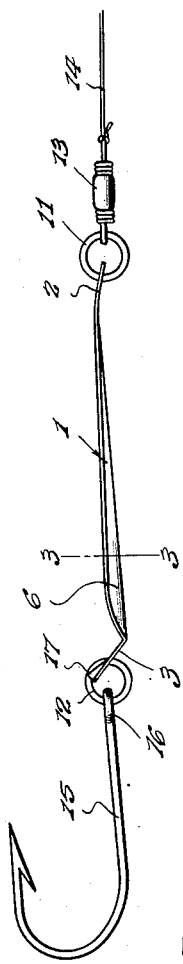
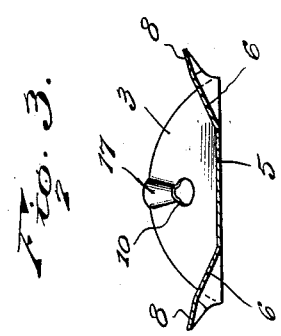
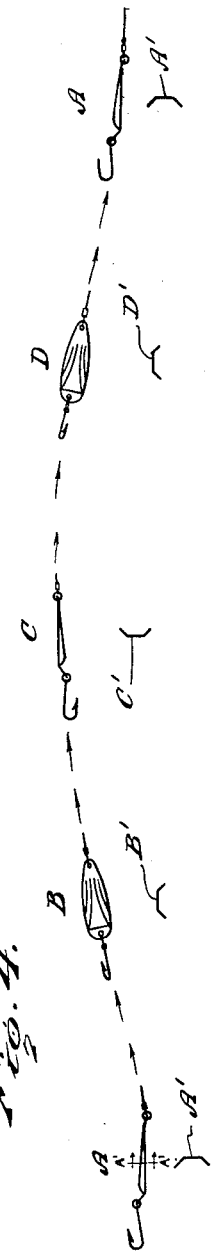
Inventor
L. M. Davis.
By Lacey & Lacey,
Attorneys Patented Apr. 28, 1931

1,803,056

UNITED STATES PATENT OFFICE

LESTER M. DAVIS, OF TACOMA, WASHINGTON

SPOON HOOK

Application filed January 3, 1930. Serial No. 418,336.

This invention relates to fishing and trapping and more particularly to a spoon hook of the type in which the spoon oscillates instead of spinning when the hook is in use.

One object of the invention is to provide a spoon hook of such construction that when it is trolled through the water it will have a darting movement very similar to that of a fish when swimming and thereby provide a lure which will be very effective.

Another object of the invention is to so form the spoon that as it is trolled through the water light will be reflected from its sides and cause fish which it is desired to catch to be attracted from quite a distance.

Another object of the invention is not only to cause the spoon hook to move through the water with a darting motion but also cause a hook connected with the rear end of the spoon to have a whipping motion imparted to it transversely of the spoon.

The invention is illustrated in the accompanying drawing, wherein

Figure 1 is a view showing the spoon hook in side elevation,

Fig. 2 is a view in elevation taken at right angles to Fig. 1,

Fig. 3 is a transverse sectional view taken on the line 3—3 of Fig. 2, and

Fig. 4 is a diagrammatic view illustrating motions which take place when the spoon hook is trolled through the water.

The spoon 1 of this spoon hook is formed of sheet metal capable of taking on a high polish and while the plate from which the spoon is formed is substantially elliptical in shape it tapers toward its front end. In spaced relation to its front and rear ends, the plate is bent transversely to form lips 2 and 3 which extend from opposite faces of the intermediate portion of the plate diagonally thereof, as clearly shown in Fig. 2. The intermediate portion is bent longitudinally along lines 4 which converge forwardly, as shown in Fig. 1, in order to define a flat central portion 5 and wings 6 extending from opposite sides thereof in diverging relation to each other, as shown in Fig. 3. These wings are bent along lines 7 in order to form lips 8 disposed at an angle to the wings, and from an inspection of Fig. 3 it will be seen that these lips are disposed beyond opposite sides of the lips 2 and 3. By having the intermediate portion of the spoon bent longitudinally upon the lines 4 and 7, the spoon will be formed with surfaces disposed in such angular relation to each other that as the spoon hook is trolled through the water light will be reflected from the spoon and fishes which it is desired to catch attracted from quite a distance.

Near the ends of the spoon are formed openings 9 and 10 through which are engaged rings 11 and 12, the ring 11 carrying a swivel 13 of a conventional construction to which a fish line 14 is to be attached and the ring 12 carrying a hook 15, the eye 16 of which is engaged through the ring. Between the opening 10 and the rear edge of the lip 3 the plate from which the spoon is formed is crimped in order to form a cam 17 which is curved transversely and tapers forwardly, as clearly shown in Fig. 3. This crimped portion or cam 17 is very important as the ring 12 moves across it from one side to the other as the spoon hook is trolled through the water and this causes a whipping movement to be imparted to the hook which closely resembles the movements of the tail of a swimming fish.

When this improved spoon hook is in use, the fishing line is tied to the swivel 13 and a piece of bacon rind or any other desired bait is fixed upon the hook or the bait may be omitted. As the spoon hook is trolled through the water, the spoon hook moves in a zigzag path when looked down upon through the water, as shown in diagram in Fig. 4, and the spoon oscillates transversely during this movement as also shown in Fig.

4. Referring to Fig. 4, it will be seen that as the spoon hook is drawn through the water and moves in a horizontal plane along the zigzag course indicated by arrows the spoon first moves from the position indicated by the letter A to that indicated by the letter B and turns from the position indicated by the letter A' to that indicated by the letter B'. As the spoon hook moves from the position B to the position C it assumes the position indicated by the letter C' and as the spoon hook moves from the position C to the position D, the spoon assumes the position indicated by the letter D'. The spoon hook then returns to the position indicated by the letter A and the cycle of movement is repeated. It will thus be seen that the spoon hook travels through the water in a zigzag path and as it moves the spoon oscillates but does not spin. As the spoon oscillates, the hook is caused to move transversely of the rear lip across the crimped portion or cam 17 and, as previously explained, this imparts a whipping motion to the hook which closely resembles the movements of a fish's tail when swimming. I have, therefore, perfected a spoon hook of a novel construction which is very effective in use as its movements through the water very closely follow the movements of a swimming fish.

Having thus described the invention, I claim:

1. In a spoon hook, a spoon consisting of a plate bent transversely adjacent its ends to form front and rear lips extending from opposite sides of its intermediate portion, a swivel connected with the front lip, the rear lip having an opening formed therein and provided with a cam between the opening and its rear edge, a hook, and an attaching ring for said hook engaged through said opening and adapted to move across said cam to impart whipping motion to the hook transversely of the spoon when the spoon hook is in use.

2. In a spoon hook, a spoon of the oscillating type having an opening formed therein near its rear end and provided with a transversely curved cam between the opening and its rear edge, a hook, and an attaching ring for said hook engaged through said opening and adapted to move across said cam to impart whipping motion to the hook transversely of the spoon when the spoon hook is in use.

3. In a spoon hook, a spoon consisting of a plate bent transversely adjacent its ends to form front and rear lips extending from opposite sides of its intermediate portion and formed with openings, rings engaged through said openings, a swivel carried by the front ring, and a hook carried by the rear ring, the intermediate portion of said plate being bent longitudinally in spaced relation to its sides along lines converging forwardly to form a flat intermediate portion and diverging wings, and the wings being bent longitudinally to form outstanding lips.

4. In a spoon hook, a spoon of the oscillatory type having an opening formed therein near its rear end, a hook having an attaching element loosely engaged through said opening and adapted to move transversely of the spoon, and means projecting from the spoon to impart whipping motion to the hook when the spoon hook is in use.

In testimony whereof I affix my signature.

LESTER M. DAVIS. [L. S.]